March 24, 1953
O. R. SMITH
2,632,417
PIPE REFORMING CLAMP
Filed Feb. 24, 1948
2 SHEETS—SHEET 1
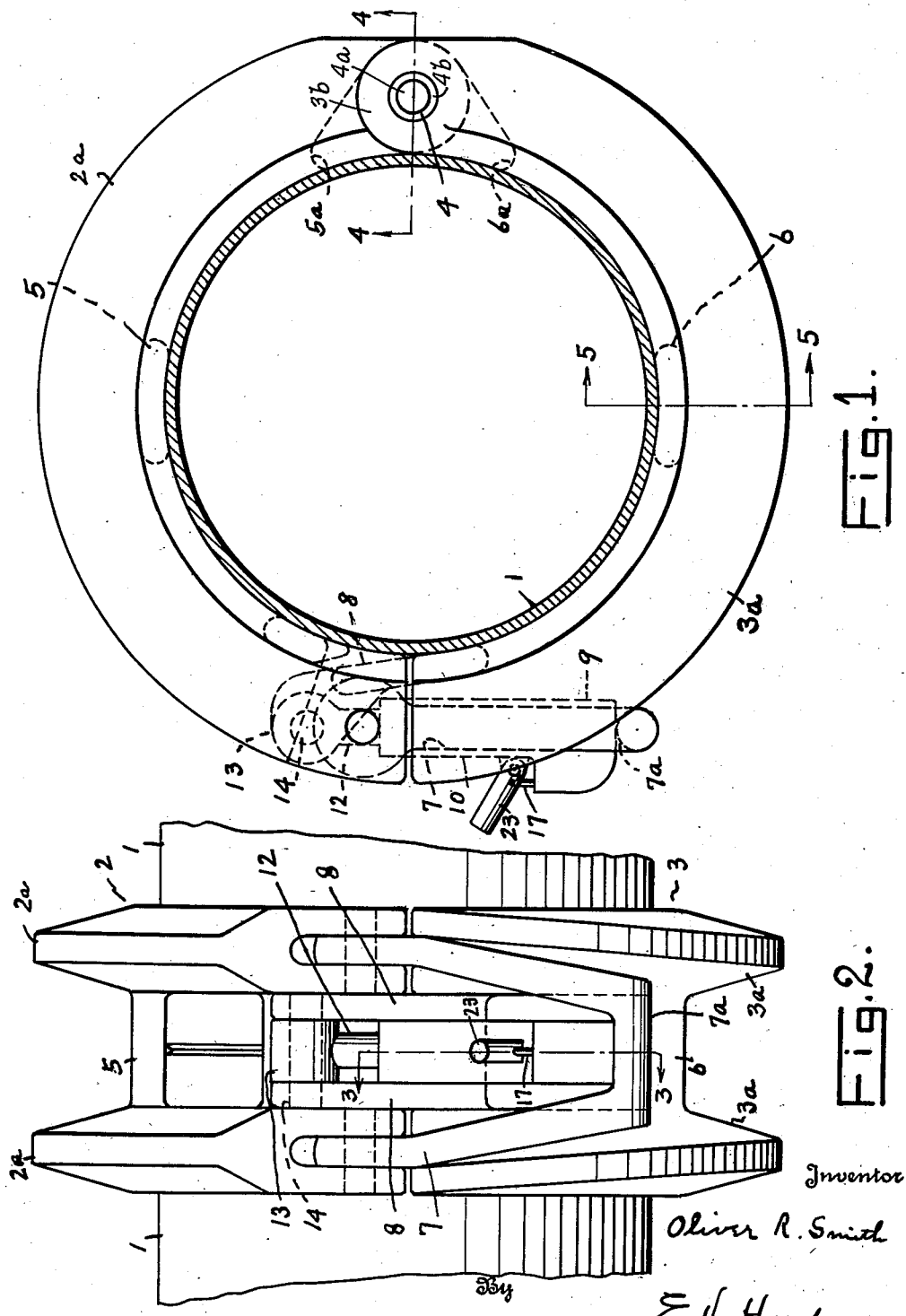
Inventor
Oliver R. Smith
By
E. V. Hardway,
ATTORNEY.

March 24, 1953  O. R. SMITH  2,632,417
PIPE REFORMING CLAMP
Filed Feb. 24, 1948  2 SHEETS—SHEET 2

Inventor
Oliver R. Smith
By
E. V. Hardway.
ATTORNEY.

Patented Mar. 24, 1953

2,632,417

UNITED STATES PATENT OFFICE 2,632,417

PIPE REFORMING CLAMP

Oliver R. Smith, Fort Worth, Tex.

Application February 24, 1948, Serial No. 10,382

1 Claim. (Cl. 113—102)

This invention relates to a pipe reforming clamp.

An object of the invention is to provide a clamp of the character described specially designed for the purpose of reforming the ends of pipe or cylindrical objects that have been distorted.

In welding together the ends of pipe in laying pipe lines, and the like, it is very desirable that the adjacent ends to be welded together be perfectly round so that they will conform. Otherwise an imperfect joint will be formed. Oftentimes these ends are out of round, due to previous handling, and the clamp herein described has been provided to easily and quickly reform distorted pipe ends while the line is being laid and the ends welded together.

It is another object of the invention to provide a clamp of the character described that has adequate power for the work may, if desired, be hand operated and is comparatively light so that it may be readily applied to the work and moved from joint to joint during the construction of the line.

Other objects and advantages will be apparent from the following specification which is illustrated by the accompanying drawings, wherein:

Figure 1 is an end elevational view of the clamp as applied to the pipe.

Figure 2 is a front elevation thereof.

Referring now more particularly to the drawings, the numerals 1, 1 designate similar pipe sections whose abutting ends are to be welded together. If either end is out of round the clamp should be applied to said end to bring them into exact alignment.

The numerals 2 and 3 designate similar, arcuate clamp sections whose complemental inner faces define a circle, when the clamps are drawn together, which is of the same diameter as the external diameter of the pipe.

Figure 4:
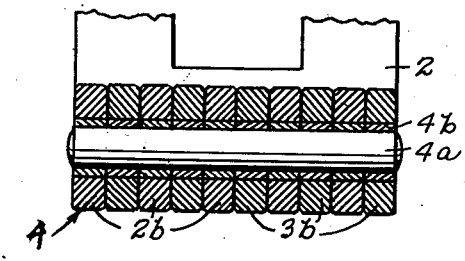
Figure 4 is a fragmentary, sectional view taken on the line 4—4 of Figure 1.
Figure 3:
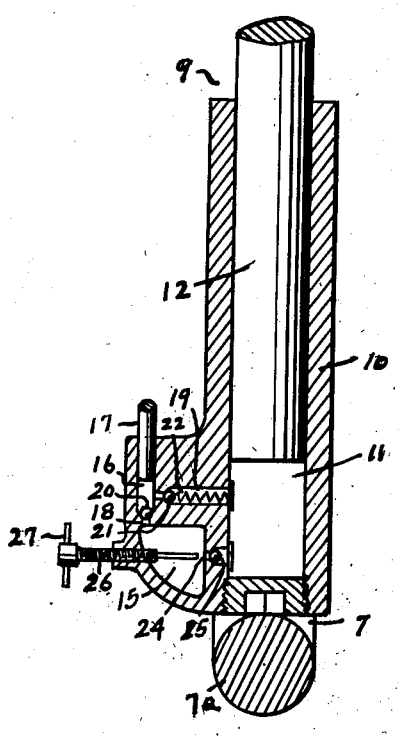
Figure 3 is an enlarged, fragmentary, sectional view taken on the line 3—3 of Figure 2.
Figure 5:
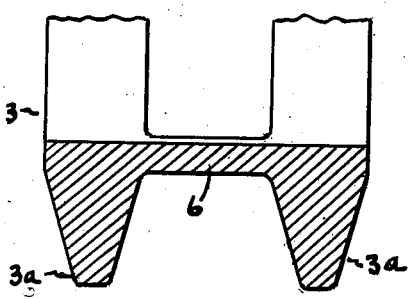
Figure 5 is a fragmentary, sectional view taken on the line 5—5 of Figure 1.

The clamp sections are hinged together, at their adjacent ends at one side of the clamp by a strong hinge, such as 4, and their other ends are free. As seen in Figure 4, the hinge 4 has interfitting portions 2b and 3b on the ends of the sections 2 and 3, respectively, which are secured together by a hinge pin 4a preferably surrounded by a bushing made up of separate sections 4b, one for each of the interfitting portions 2b and 3b and fitting into aligned perforations in the respective portions.

These clamp sections are formed of spaced, radially outstanding, outwardly tapering, arcuate flanges 2a, 2a and 3a, 3a united integrally by means of the spaced webs 5, 5a and 6, 6a.

There is a clevis 7 the free ends of whose arms are pivoted to the free ends of the corresponding flanges 2a, 2a at points spaced inwardly of the outer edges of the flanges and this clevis works between the flanges 3a, 3a, as shown in Figures 1 and 2.

Secured to the free ends of the section flanges 3a, 3a there are the spaced arms 8, 8 which fit between the free ends of the flanges 2a, 2a.

There is a hydraulic jack designated generally by the numeral 9 and having a cylinder 10 containing a large fluid chamber 11 in which the plunger 12 is fitted. This plunger extends out beyond the cylinder and has a transverse bearing 13 between the free ends of the arms 8 and connected thereto at points spaced inwardly of the outer edges of the flanges by the cross pin 14.

The free end of the jack 9 is enlarged forwardly and contains a fluid reservoir 15 for containing an operating fluid, such as oil, and the forwardly enlarged portion of the jack is provided with a cylindrical chamber 16 in which the piston 17 works, and which communicates with said reservoir.

Upon reciprocation of piston 17 the operating fluid will be taken from the chamber 15, through port 18 and into chamber 16 and forced into chamber 11 through the channel 19. The port 18 is controlled by a back pressure valve 20 and the channel 19 is controlled by a back pressure valve 21 normally closed by a pressure spring 22.

The piston 17 may be reciprocated by a lever 23 pivoted to the jack and to which the outer end of piston 17 is pivoted. If desired an extension handle may be fitted to lever 23 for ease of operation.

The outer end of chamber 11 is connected with reservoir 15 by a port 24 controlled by a back pressure valve 25 and threaded through the forward wall of the reservoir there is a release rod 26 whose inner end is reduced in diameter and blank and arranged opposite port 24. The outer end of the rod 26 has a grip member 27 by means of which it may be turned. When necessary the rod 26 may be run inwardly to open valve 25 to relieve the pressure in chamber 11 and allow the operating fluid to flow therefrom into reservoir 15 and the rod then screwed outwardly to allow valve 25 to close port 24 to stop said return flow. The cylinder 10 may then be moved along plunger 12 to shorten the overall length of the jack.

Figure 6:
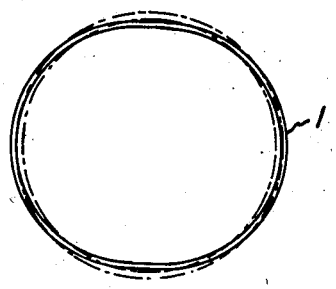
Figure 6 is a diagrammatic end view of a distorted pipe end, showing the shape to which it is to be restored, in dotted lines.

The clamp may be fitted around adjacent pipe ends, as shown in Figure 2, if said ends, or either of them, are out of round and the clevis 7 swung into position so that its cross bar 7a will be in alignment with the corresponding end of the jack 9 and the lever 23 operated to take the operating fluid out of the reservoir 15 and force it into the chamber 11. This will first move the cylinder 10 outwardly against the cross bar 7a and then will move the plunger 12 in the opposite direction thus gradually drawing the free ends of the clamp sections 2 and 3 together around the pipe ends and restoring the end or ends of the surrounded pipe from the shape shown in full lines in Figure 6 back to a perfectly round shape, if distorted, as shown in dotted lines in said Figure 6.

While the clamp has been particularly designed for the purpose of reforming the adjacent ends of pipe that have been distorted its use is not limited to that specific purpose but it may be used to re-form pipe that has been distorted between its ends or for other similar purpose; and the drawings and description disclose what is now considered to be a preferred form of the invention by way of illustration only while the broad principle of the invention will be defined by the appended claim.

What I claim is:

In a clamp for reforming pipe and having arcuate clamp sections, each of said sections being formed of spaced, radially outstanding, arcuate flanges united by spaced webs and each flange having an arcuate face on the inner side thereof, said sections being hinged together at one side of the clamp inwardly of the outer edges of the flanges, the complemental faces of the corresponding flanges defining, substantially, a circle when the sections are fully closed, a clevis pivotally connected to the free end of one of the sections inwardly of the outer edges of the flanges thereof and having a cross bar at its free end lying between the flanges of the other section, a jack one end of which is engageable with the cross bar of the clevis, spaced arms secured on the other of the sections between the flanges thereof and extending between the flanges of said one of the sections, said jack being pivotally connected at its other end to the free ends of said arms.

OLIVER R. SMITH.

REFERENCES CITED

The following references are of record in the file of this patent:

UNITED STATES PATENTS

| Number | Name | Date |
|---|---|---|
| 538,465 | Peyton | Apr. 30, 1895 |
| 1,104,579 | Thorsby | July 21, 1914 |
| 1,550,161 | Hamm | Aug. 18, 1925 |
| 1,693,064 | Tipton | Nov. 27, 1928 |
| 1,774,530 | Sheehan | Sept. 2, 1930 |
| 1,853,641 | Seward | Apr. 12, 1932 |
| 2,284,958 | Grime | June 2, 1942 |
| 2,308,340 | Newlon | Jan. 12, 1943 |

FOREIGN PATENTS

| Number | Country | Date |
|---|---|---|
| 14,441 | Great Britain | Oct. 12, 1915 |